MEANS FOR ELECTROSTATIC COATING

Original Filed April 10, 1962 5 Sheets-Sheet 1

Inventors
M.A.R. Point
G. Nicolas
By [signature]
Attorneys

MEANS FOR ELECTROSTATIC COATING

Original Filed April 10, 1962

Inventors
M.A.R. Point
G. Nicolas
By Holcombe, Wetherill & Brisebois
Attorneys

MEANS FOR ELECTROSTATIC COATING

Original Filed April 10, 1962 5 Sheets-Sheet 3

Inventors
M.A.R. Point
G. Nicolas
By Holcombe, Wetherill & Brisebois
Attorneys

MEANS FOR ELECTROSTATIC COATING

Original Filed April 10, 1962

Inventors
M. A. R. Point
G. Nicolas
By Holcombe, Wetherill & Brisebois
Attorneys July 26, 1966 M. A. R. POINT ET AL 3,263,127
MEANS FOR ELECTROSTATIC COATING
Original Filed April 10, 1962 5 Sheets-Sheet 5

Inventors
M. A. R. Point
G. Nicolas
By
Attorneys

United States Patent Office
3,263,127
Patented July 26, 1966

3,263,127
MEANS FOR ELECTROSTATIC COATING
Marcel Auguste Roger Point, Grenoble, and Guy Nicolas, Meylan, France, assignors to Societe Anonyme de Machines Electrostatiques, Paris, France, a corporation of France
Continuation of application Ser. No. 186,436, Apr. 10, 1962. This application Mar. 26, 1965, Ser. No. 444,943
Claims priority, application France, Apr. 14, 1961, 858,767, 858,768
6 Claims. (Cl. 317—3)

This application is a continuation of our prior application S.N. 186,436, filed April 10, 1962, now abandoned.

This invention relates to electrostatic processes, wherein particles of finely divided coating materials are deposited on surfaces of articles to be coated, by the effect of an electrostatic field created between the particles and the work surface.

It is an object of this invention to provide improved means for and method of electrostatic coating, whereby solid pulverulent coatings may be deposited on work articles in a more efficient controlled and reliable manner than was heretofore possible.

Electrostatic coating processes have been known and used for many years. However, they have had only limited uses heretofore and have not gained widespread recognition especially for the coating of work with solid pulverulent materials, e.g. plastic materials, despite certain indisputable advantages such processes offer as compared to other coating methods. A chief difficulty heretofore encountered in the electrostatic coating procedures of the prior art has been the fact that unless a considerable amount of precautionary measures were taken, greatly complicating plant installations, only a relatively low proportion of the coating particles actually reached the work surface, while a substantial amount would stray towards and settle upon the surface of nearby structures with obvious objectionable consequences. Those particles that did reach the desired surface of the work were only poorly bonded thereto, and even though the coated work was immediately subjected to a heating step for fusing the deposited particles to the underlying surface, it was not found possible consistently to obtain uniform coated products. In an attempt to improve results, a preheating of the work was invariably used prior to the coating step. This measure however, in addition to being a complication in itself, only very partly overcame the above undesirable conditions.

The present invention is based on a recognition by the applicants that the generally very imperfect results heretofore obtained in electrostatic coating procedures especially as applied to solid pulverulent coatings, all point to an imperfect control of the electrically charged condition of the particles; that is, it has been found that in the prior procedures only a relatively small fraction of the full amount of particles discharged actually carried an electric charge of the proper polarity and high value required to ensure that the particle will be electrostatically attracted towards and bonded to the surface of the work. A great proportion of the particles were randomly charged or not charged at all, and hence tended to stray. It has, accordingly, been an object of this invention to provide an improved electrostatic coating process positively ensuring that substantially all of the particles discharged towards the surface will be provided with electric charges of the requisite sign and charge value.

We have found that this result can consistently be achieved, in accordance with a broad aspect of the invention, if the cloud of coating particles, suspended in a stream of air of other carrier gas, is discharged through an outlet passage having a transverse cross sectional contour including a large and comparatively small dimension, and an ionizing electrode of suitable elongated form and connected to a suitable high voltage source, is positioned adjacent the outlet passage so as to have a main dimension of said electrode substantially coextensive with said large dimension of the passage contour. In this manner, there is formed a sheet of particles in which substantially all the particles are ionized throughout the depth of the sheet.

When the teachings of this invention are applied, as will be more fully described hereinafter, it is found that the various difficulties and defects heretofore encountered in electrostatic coating processes of the prior art are completely eliminated or very greatly reduced and that unexpectedly improved results are achievable. Due to the improved, positive, control of the charge condition of all the particles of coating material, substantially all the particles are found to travel under a compelling directive force towards the surface of the work, settle thereon, and are immediately bonded thereto by purely electrostatic forces, to such a degree that the subsequent post-heating step, for fusing the particles to the supporting surface, can be delayed for many hours and in some cases even completely omitted. It is further found that the preheating of the work surface, a measure believed indispensable heretofore for obtaining any degree of bond for the deposited particles, becomes entirely superfluous in a great majority of applications.

Some embodiments of the invention will now be described by way of example with reference to the accompanying drawings, wherein:

FIG. 23 is a generally similar view of apparatus for carrying out a process according to the invention in the case where the work to be coated is a continuous wire or the like.

Throughout the drawings, similar reference numerals have been used wherever possible to designate similar or comparable elements.

Basically the invention contemplates discharging a cloud of pulverulent particles suspended in an airstream, through a nozzle, comprising means defining a passage having a cross sectional contour with a relatively large length width ratio so as to produce a narrow sheet of the particles; ionizing electrode means are provided at the outlet of the passage and substantially coextensive with the length dimension thereof so as to ensure positively that all the particles throughout the depth of the sheet will be carried to the desired potential, or supplied with the desired electrostatic charge. The passage may be straight or annular in cross sectional contour to produce flat or annular sheets; and the ionizing electrode will then, correspondingly, be in the form of a straight or a circumferential element. Other variations of these basic forms will also be described.

Figure 1:
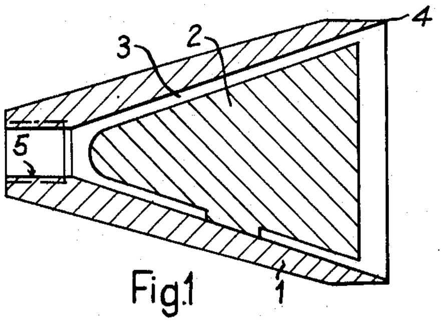
FIGS. 1 and 2 illustrate in axial cross section and in end view respectively, a first form of improved electrostatic powder spray nozzle according to the invention, for discharging an annular sheet of particles.
Figure 2:
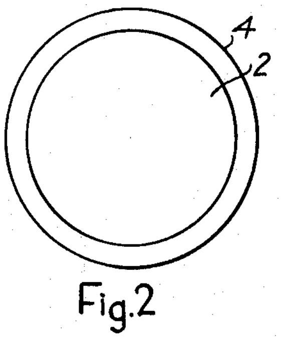

A basic form of electrostatic powder spray nozzle for practicing the method of the invention is shown in FIGS. 1 and 2 as comprising an outer member 1 in the general form of a cone frustum having a passage formed therethrough, said passage including an axial inlet section 5 followed by a flared recess opening outwardly from the outlet end of the nozzle. Supported within the flared recess by means such as radial spider arms one of which is seen towards the bottom of FIG. 1, is a generally conical inner member 2, so dimensioned as to define a narrow annular flow passage 3 between the two members. The outer member 1 has a relatively sharp annular tip or edge 4 which projects beyond the corresponding end of the inner member 2 at the outlet end of the nozzle, as shown in FIG. 1, to serve as an ionizing zone or electrode as will presently be made clear.

In this embodiment the outer member 1 is formed from electrically conductive material and is connected in operation to a high voltage source of D.-C. energy, as later described; the inner member 2 may be of conductive or dielectric material as desired.

In operation, the inlet section 5 of the nozzle is connected, as by the screw thread shown, to the outer end of a tubular gun device connected to a source of the desired pulverulent coating material suspended in air at moderately high pressure, as later described. When the gun is actuated, as by finger pressure on a trigger for example, the mixture of air and particles flows into the inlet section 5 of the nozzle and thence through the narrow annular passage 3 to form an annular jet or sheet. Such a sheet is characterised in that in any transverse cross section of it, the sheet has one dimension (the radial dimension or thickness) that is comparatively very small with respect to the other (i.e. circumferential) dimension of said cross section. Hence, as such annular sheet issues out of the nozzle and flows past the annular edge 4 of outer member 1, constituting the ionizing electrode zone, it will be evident that the sheet can be effectively ionized throughout its entire radial thickness, so that substantially all of the particles of the sheet-like jet issuing from the nozzle will be charged to a common potential of the requisite polarity and highly desired magnitude. It has been found that when a jet of this character is directed towards an object maintained at ground potential, practically all the particles forming the jet can be made to reach the surface of the object under the sole action of the electrostatic field with only a negligible number of the particles, if any, straying towards other nearby surfaces.

Moreover, the particles once deposited on the surfaces of the articles become bonded thereto by the action of electrostatic forces for a prolonged period of time.

Figure 3:
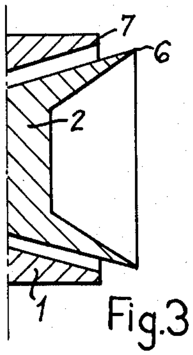
FIG. 3 shows in axial section the front of part of a modified form of nozzle.

The modified form of nozzle shown on FIG. 3 differs from the one just described only in that the ionizing electrode is provided by the sharp annular tip 6 of the inner member 2 rather than the outer member 1; accordingly the inner member is here made of electrically conductive material and projects axially beyond the outer member 1, which may be made of conductive or non-conductive material.

Figure 4:
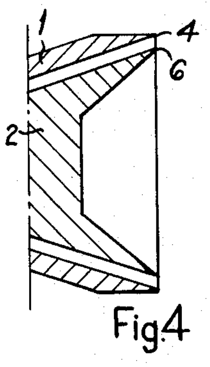
FIG. 4 is a similar view of a further minor variation.

In the further embodiment of FIG. 4 both the outer and inner members 1 and 2 are formed of electrically conductive material and are arranged for connection to a common high-voltage source, both members being formed with sharp annular edges 4 and 6 lying substantially in a common outlet plane of the nozzle.

Figure 5:
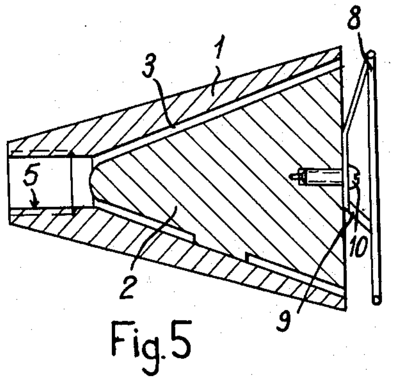
FIGS. 5 and 6 are an axial section and end view respectively of another modified form of nozzle.
Figure 6:
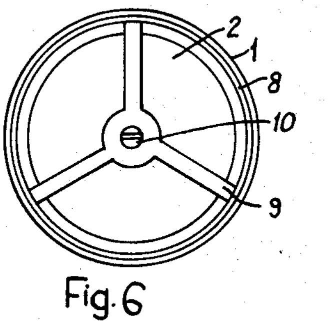

In the further embodiment of the invention shown in FIGS. 5 and 6, the ionizing electrode rather than being integral with one or both of the coaxial members forming the nozzle, is provided by a separate length of wire 8 bent to a circular shape and supported through spider arms 9 and a disc-like hub portion connected thereto from the inner body member 2 by means of a screw 10 engaging hub portion and threaded in a central threaded hole of said member. The said inner member 2 is made of electrically conductive material and is adapted for connection with the high-voltage source, while the outer member 1 may be conductive or not as desired. It will be evident that the wire electrode 8 might equally as well be supported from the outer member 1 rather than the inner member, in which case the said outer member may be made of conductive material and connected to the high-voltage source.

As a further variation of this embodiment, the electrode wire 10 may be directly connected to the high-voltage source, being mechanically supported from either the inner or outer member (or both) in a position similar to that shown in FIG. 5, and in such case both the inner and outer members 1 and 2 of the nozzle may be made of dielectric material, a feature which may have advantages in many applications.

Figure 7:
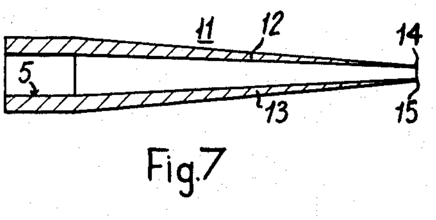
FIGS. 7 and 8 and 9 are a longitudinal section, a plan view and an end view of another embodiment of improved nozzle for producing flat rather than annular sheets.
Figure 9:
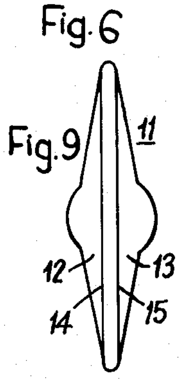
Figure 8:
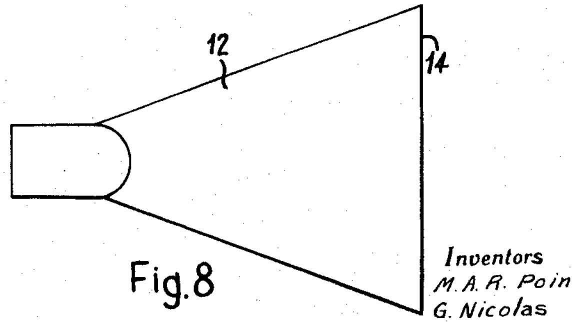

FIGS. 7, 8 and 9 illustrate an embodiment of an electrostatic powder discharge nozzle according to the invention constructed to provide flat sheets of powder rather than annular sheets as so far described. The nozzle generally designated 11 comprises a pair of spaced plates 12 and 13 of generally triangular or trapezoidal contour defining between them a narrow flow passage from the axial inlet section 5 to the wide flat outlet end of the nozzle. In the example here shown, both plates or flanges 12 and 13 are formed at the outlet end of the nozzle, with sharp flat edges 14 and 15 lying in a common outlet plane of the nozzle and providing ionizing electrode portions; both flanges 12 and 13 are made of conductive material and connected in operation to a high voltage source. However, another modification shown in FIGS. 10–12, would lie in providing a separate ionizing member in the form of a straight length of wire 8 supported in front of the discharge outlet of the nozzle 11 in the path of the flat of particles issuing therefrom.

Figures 10, 11, 12, 13, 14, 15, 16, 17:
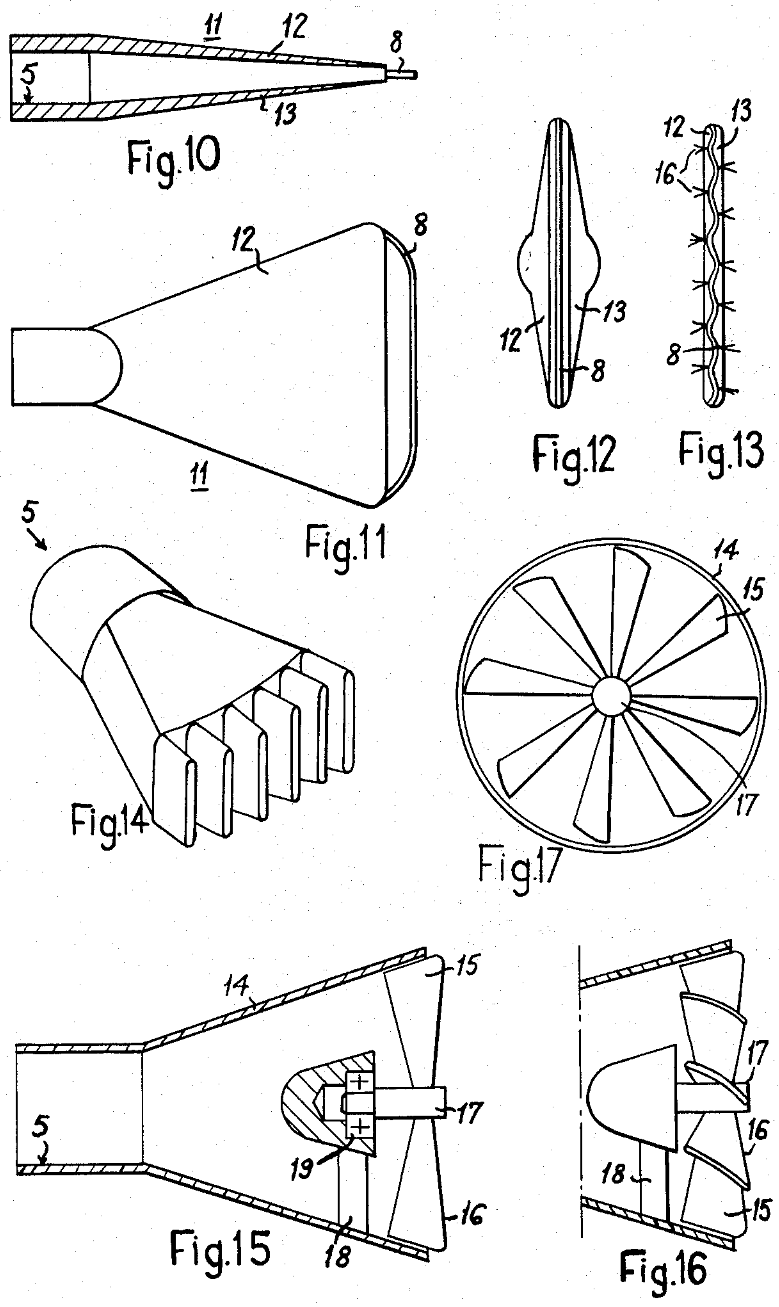
FIGS. 10, 11 and 12 are respectively similar to the views of FIGS. 7, 8 and 9, but relate to a modified form of nozzle for producing flat sheets.
FIG. 13 is a view generally similar to FIG. 12, but illustrates a minor variation.
FIG. 14 is a perspective, simplified view showing a composite nozzle assembly according to the invention for producing solid jets rather than thin sheets of spray powder while still retaining the benefits of the invention.
FIGS. 15, 16 and 17 are an axial section, a partial plan view and an end view, respectively, of another embodiment of the invention for producing solid jets of powder material.

A variation of this embodiment is shown in FIG. 13 wherein the ionizing wire 8 rather than being substantially straight in the part thereof positioned within the path of the sheet of particles, is bent to a sinuous or wavy shape. It will be observed that a similar variation may be provided in the embodiment described above with reference to FIGS. 5 and 6, where the generally circular electrode wire 8 may be made sinuous or wavy while retaining its circular overall configuration. The main advantage of a sinuous wire electrode is that it is more closely coextensive than a straight wire can be, with the transverse cross section of the sheet of particles issuing from the nozzle, i.e. the maximum distance from any particles of the sheet to a point of the ionizing wire is even further reduced. Another advantage of the wavy electrode is that a concentration of the electrostatic field occurs at the points of greatest curvature thus provided in the longitudinal contour of the wire. If desired, a generally helical shape may be imparted to the wire electrode rather than the sinuous shape shown.

While an electrostatic powder spray nozzle according to the invention in all the forms so far disclosed discharges a sheet like jet of powder having large breadth/thickness ratio for the purposes earlier explained, it is contemplated that a plurality of such elementary nozzles may be combined so as to participate in producing an overall jet having any desired depth or thickness dimension, where this is deemed desirable. Thus, FIG. 14 illustrates such a composite spray nozzle including six juxtaposed elementary discharge nozzles, each of which may assume any of the forms shown in FIGS. 7–9, of FIGS. 10–12, or FIG. 13. All of the elementary nozzles are supported within an outer casing of suitable shape and their respective inlets communicate with a common inlet 5. The outlet ends of the elementary nozzles are disposed in parallel juxtaposed relation, as clearly shown in the figure. While the details of the elementary nozzles are not shown in FIG. 14 for simplicity, it will be understood that each elementary nozzle would be provided with its own ionizing zone or electrode substantially coextensive with the narrow cross-sectional dimension of the particular elementary nozzle in accordance with the fundamental teaching of the invention.

FIGS. 15–17 illustrate a further form of improved nozzle comprising a flared frustoconical nozzle body 14 provided with the axial inlet 5 for air and powder material. Supported within the outlet portion of the nozzle is a fan 17 having its hub portion 17 rotatably mounted through bearings 19 in a streamlined supporting member supported centrally of the nozzle body 14 by way of one or more radial arms such as 18. Each of the blades of the fan 15 is formed with a relatively sharp outer edge as at 16, and the fan blades 15 are electrically connected by way of the hub and bearing support, to a high voltage source not shown.

In the operation of this embodiment the fan 15 is set into rotation by the air stream delivered from the inlet 5, and the outer or trailing edges of the revolving, electrically energized fan blades produce a highly efficient ionization of the particles as they issue therepast.

Figures 18, 19, 20, 21, 25:
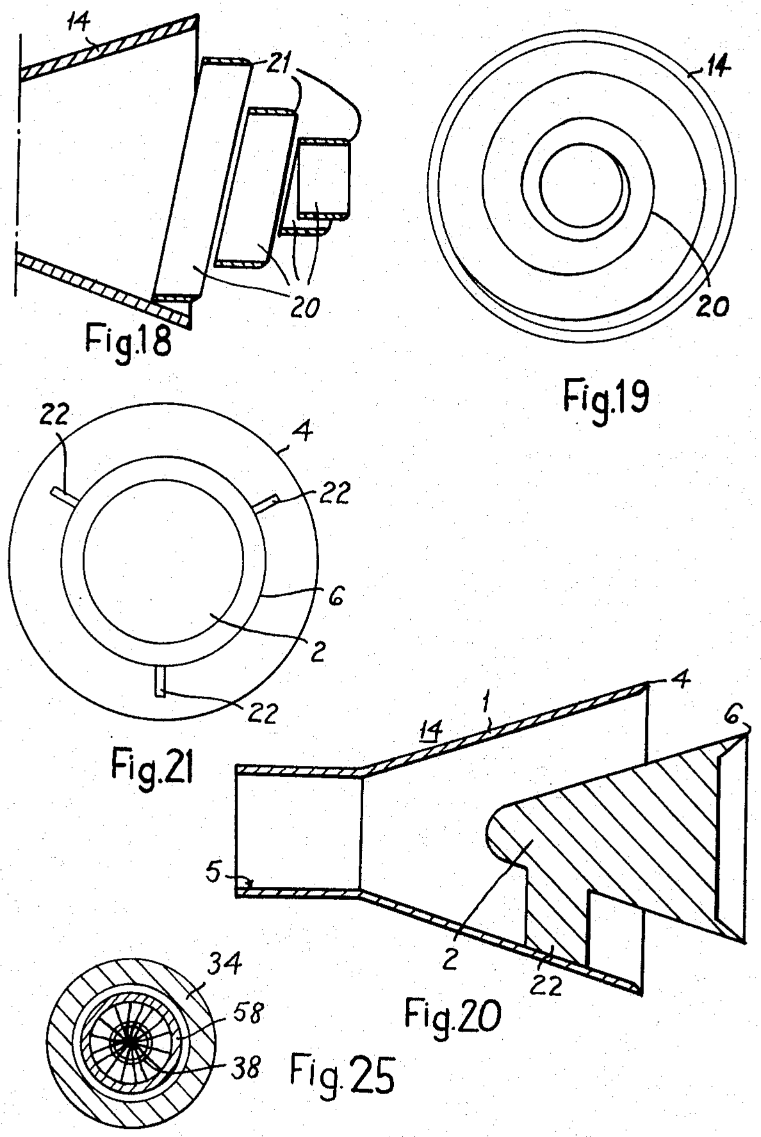
FIGS. 18 and 19 are a longitudinal section and an end view of another modification whereby solid jets of powder may be sprayed while retaining the teachings of the invention.
FIGS. 20 and 21 are an axial section and an end view of another modification.
FIG. 25 is a cross section of FIG. 24.

A further variation is illustrated in FIGS. 18 and 19, wherein the nozzle comprises a flared frustoconical body 14, and a generally spirally coiled metallic strip 20 supported in the outlet part of said body and preferably projecting outwardly from it as shown, said strip being connected to the high-voltage source to constitute the ionizing zone at the sharpened outer edge 21 of the strip.

It will be noted that in both the embodiments last described the teachings and benefits of the invention are retained. Thus in FIGS. 15–17, the blades of the revolving fan 15 are to be regarded as chopping up the stream of air and powder into a plurality of elementary sheets each having a narrow cross dimension and a comparatively long (radial) breadth sectional width/dimension with which an ionizing zone, provided by the blade edges 16, is substantially coextensive. Similarly in the embodiment of FIGS. 18 and 19, the stream of particles actually constitutes a spiral sheet having a narrow dimension along the radial coordinate of its cross section, and a long (circumferential or spiral) dimension with which the ionizing zone provided by spiral edge 21 is coextensive.

The precise value of the dimensional ratio in the cross section of the jet formed by a nozzle according to the invention may vary considerably from instance to instance in dependency on such factors as the nature and size of the particles to be discharged, the velocity of the airstream, and the ionizing voltage used. A convenient value for said ratio suitable in many practical cases, may be indicated as 10:1. However the ratio used may depart considerably from such figure. If it is desired for some reason to decrease said ratio, i.e. provide a sheet of comparatively large thickness relative to its breadth, while still preserving most of the advantages of the invention, a construction on the lines shown comprises a flared frustoconical outer body 1 and an inner body 2 supported axially within outer body 1 by means of spider arms such as 22. Both the inner and outer bodies are made of or lined with electrically conductive material and both are provided with sharp annular outer edges at 4 and 6 to provide ionizing zones of electrodes in operation. Thus the general arrangement is somewhat similar to that described above with reference to FIG. 4. However it will be noted that the inner part 2 is so dimensioned and positioned relative to outer part 1 as to define an annular discharge space therebetween which has a substantially greater radial dimension than in FIG. 4, and further it will be seen that the inner annular ionizing zone provided by the outer edge 6 of the inner body is positioned in a different plane from the outer ionizing zone provided by outer edge 4 of the outer body 1. It is found that with such an arrangement a substantially thorough ionizing of all the particles through the depth of the sheet can usually be achieved in spite of the comparatively large thickness of the sheet provided by the nozzle in this embodiment.

Referring now to FIGS. 22–25, installation and procedure will now be described suitable for carrying out improved electrostatic powder-coating processes using the nozzles constructed according to the invention.

Figure 22:
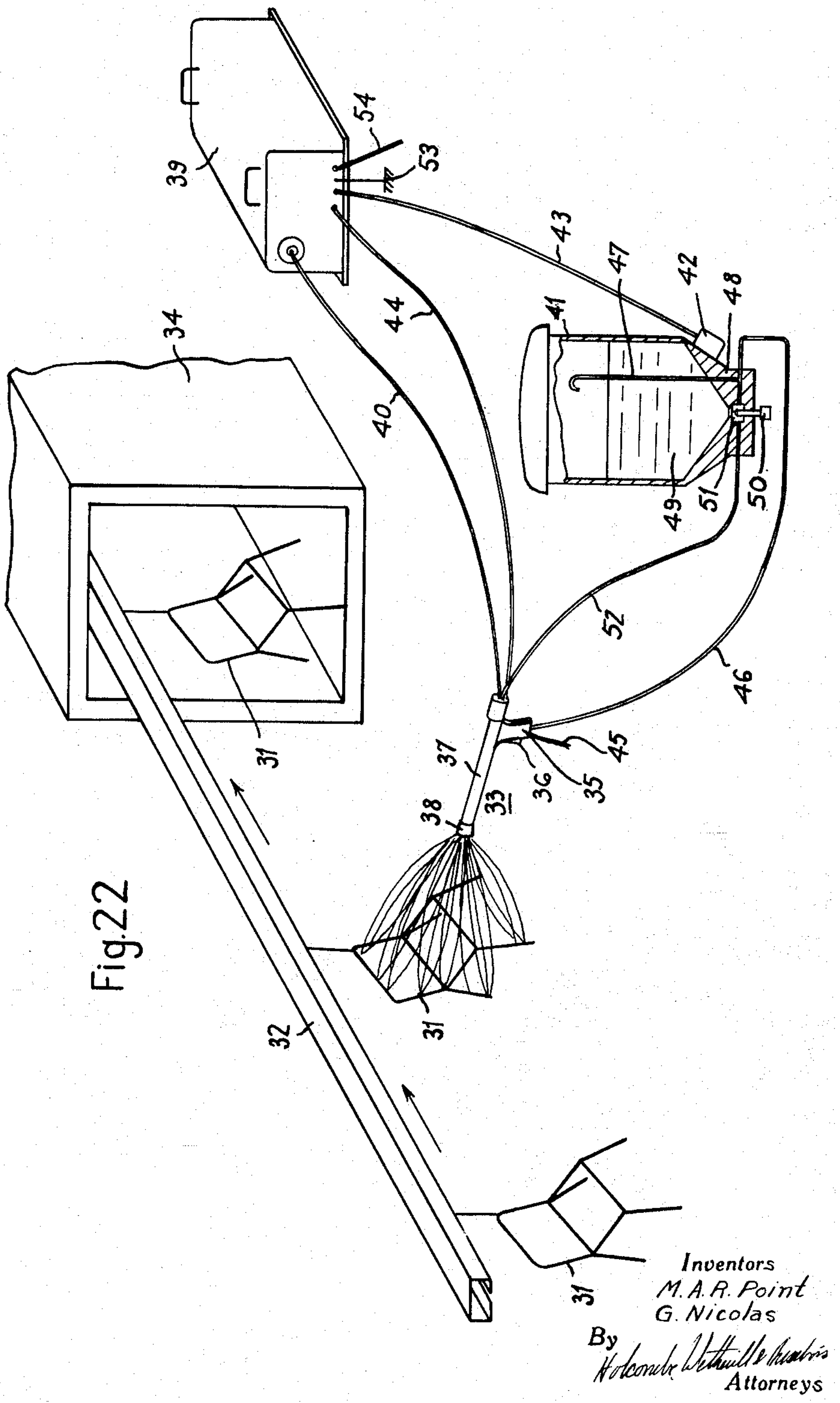
FIG. 22 is a schematic perspective view, with parts in section of a general layout of apparatus use in carrying out an electrostatic powder spraying process according to the invention.

In FIG. 22 are shown a series of work articles, herein metal chair frames, suspended at spaced points from an overhead conveyor line 32 and fed at a suitable rate, through any conventional means not shown, past a spraying station generally designated 33 and thence into and through a curing chamber or oven 34. The conveyor 32 and through it the work articles 31 are connected to ground.

At the spraying station there is provided a spray gun having a tubular body 37 provided with a pistol grip 35 and trigger 36 at its rear end and having inserted in its forward end a nozzle 38 which may be of any of the forms earlier described herein. The gun body 37 is made of electrically non-conducting material while the grip 35 may be metallic and grounded. The nozzle 38 may be supported through any suitable means, not shown, in the front end of the body 37. The ionizing element of the nozzle 38, which may assume any of the forms shown for said element in any of the FIGS. 1–21 is connected by way of a safety resistor, not shown, and a switch manually operated through trigger 36, to a terminal positioned at the rear end of the gun body 37 and connectable by way of a flexible conductor 40 with a high-voltage terminal of a D.-C. supply unit 39 of any suitable type. Supply unit 39 has a shielded casing grounded at 53, and is shown connected to a suitable A.-C. supply at 54. Preferably, depression of trigger 36 does not directly control the energization of the nozzle ionizing element, but does so through a low-voltage relay switch arranged with the gun body 37 and powered from a low-voltage terminal of source unit 39 through another flexible conductor 44.

A store of powder material to be sprayed is shown contained within a tank 41, which in operation is preferably continually subjected to agitation by means of a conventional vibrator device 42 engaging a thickened base wall of the container 41 and powered from the source unit 39 through a low-voltage conductor 43. The bottom of reservoir 41 is funnel-shaped and opens through a central powder discharge outlet into a small outlet chamber 51 which has one side connected through a flexible line 52 with a powder inlet provided at the rear of sprayer body 37. The rate of feed of powder through the discharge outlet into chamber 51 is controlled through adjustment of a needle valve 50 associated with said outlet. Compressed air from a suitable source, not shown, is delivered under moderate pressure into the grip portion 36 of gun 37 by a flexible line 45, by way of a normally closed inlet valve positioned in said grip and which is opened on depression of the trigger 36. When said valve is thus opened the compressed air from line 45 is passed by way of another flexible line 46 connected to the grip 35 into the other side of the chamber 51 in reservoir 41. At the same time part of said air is branched off through a riser tube 47 which extends up through the body of powder 49 in the reservoir and opens into the space overlying said powder so as to create a pressure in said space aiding the downward feed of powder through the bottom outlet into chamber 51. Thus so long as trigger 36 is held depressed, it will be seen that a metered flow of air and powder material is supplied from the reservoir chamber 50 through line 52 into the rear end of gun body 37, whence it is passed into the inlet end (such as 5 in FIGS. 1–20) of the discharge nozzle 38. At the same time the ionizing element or elements of said nozzle 38 is or are placed under high electric tension as long as the trigger 36 is depressed as earlier indicated.

The reason the cut-off valve operated by trigger 36 and serving to initiate and arrest the delivery of the powder spray is interposed in the path of the particle-free air stream, i.e. conduit 45–46, as described above, rather than being positioned in the path of the air-suspended stream of particles in conduit 52, is that it is essential, if the process of the invention is to work properly, that there be no obstructions interposed in the path of the stream of air-suspended particles stream from the region of formation of the stream (chamber 51) to the region in which the stream is shaped into a thin cloud (nozzle 38). Any obstructions such as a valve or sharp bend would cause many types of powder to settle out of the airstream so as to quickly clog the system and make it inoperative. As clearly shown in the drawings, no such obstructions capable of causing powder particles to settle out, are provided between said region of formation and the region in which it is shaped into a thin cloud.

In accordance with a preferred feature of the invention, the nozzle electrode should be carried to a high voltage so selected as to provide a voltage gradient of at least about 7 kilovolt/centimeter between the nozzle and the work surface, and preferably a gradient of at least about 10 kilovolts/centimeter.

The powder issues from the nozzle 38 in the form of a sheet which is ionized completely throughout its thickness or depth dimension as earlier described in detail and the resulting ionized particles proceed at a relatively slow velocity to seek out and reach the grounded surfaces of the work article 31 in front of which the gun 37 is held. It is found that when the process just described or a similar process is used, employing improved spray nozzles of any of the types hereinabove described, substantially of the particles in the sheet issuing from the nozzle effectively reach the work surfaces including both the surface areas actually "seen" by the nozzle, and those surface areas concealed from the nozzle by the other parts of the work, such as the rear sides of the chair frame members shown in FIG. 2. Moreover, the particles thus deposited are found to adhere to the surfaces without any further assistance (such as pre-heating) for a considerable period of time, say several hours. The post-heating step shown as performed in the oven 34 is of course usually necessary to provide a permanent bond of the coating on the work, through partial fusion of thermosetting of the particles, but if desired such post-heating or curing step may be deferred for a substantial period and sometimes even omitted. These beneficial results which are in direct contrast with the conditions encountered with conventional electrostatic powder coating systems are attributable primarily to the fact that all of the particles in the sheet issuing out of the improved nozzle are effectively ionized throughout the depth of the sheet and all are charged electrically with a common polarity, rather than being only partially and/or randomly charged as has generally been the case with similar jets of powder as produced by conventional electrostatic nozzles.

Further, for the reasons just indicated, it is normally found entirely superfluous to pre-heat the work prior to spraying it, a possibility not provided by any of the electrostatic powder coating processes hereto available as far as applicants are aware. It is also found that the invention makes it possible to produce satisfactory coatings on electrically non-conductive materials provided the surfaces to be coated are first wetted.

Figure 23:
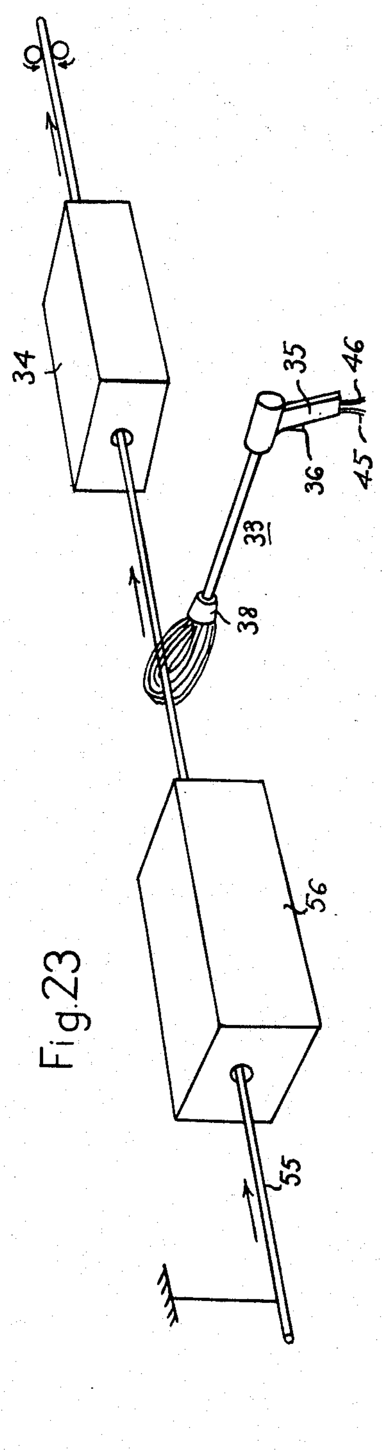

FIG. 23 illustrates the method and system of the invention as applied to the powder-coating of a continuous work element such as wire 55. The electrically grounded wire 55 is shown as first being passed through a pre-heating unit 56 of any suitable character; however this pre-heating step is merely shown here for the purpose of indicating that such step may well be used with the method of the invention should this be desired, and it is emphasized that in most cases a pre-heating unit such as 56 would be omitted. The wire 55 is fed past the electrostatic powder-coating station shown as comprising a similar spray gun 33 as in FIG. 22, and then is passed through the post-heating or curing oven 34 beyond which provision is made for allowing it to cool. The feeding means for the wire 55 may include suitable rollers, one pair of which is shown at 57.

Figure 24:
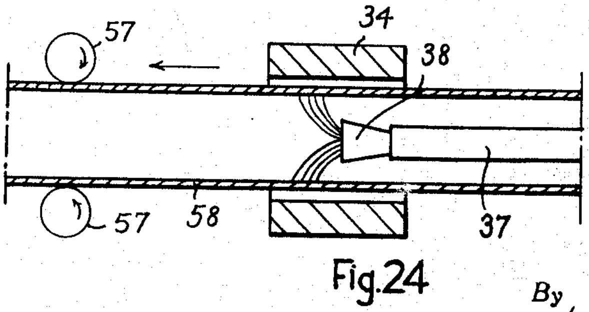
FIG. 24 is a fragmentary view mostly in longitudinal section illustrating the process of the invention as applied to the coating of the internal surface of tubular work.

FIGS. 24 and 25 depict the invention as applied to the powder-coating of the inner surfaces of tubular work. As shown, the metal tubular work 58 is fed axially by the feeder rollers such as 57 in the leftward direction as indicated by the arrow. The spray gun 37 may be similar to that described with reference to FIG. 22 and provided with the improved nozzle 38 of the invention. The gun 37 together with its electric conductors 40, 44 and piping 45, 46, 55, would in such a case be supported within the tubular work 58 on a suitable truck mounted on rollers engaging the inner surface of the tube, according to procedure generally known in connection with the treatment of inner surfaces of tubular work. The pistol grip 35 and trigger 36 would in this case preferably be omitted and means provided for actuating the switch and valve means in the pistol body through suitable electrical or other control means from a control station. In FIG. 24, reference 34 designates an annular heater unit, e.g. an induction heater, surrounding the tubular work and preferably arranged to be energized simultaneously with the spray gun 37.

It will be clear from the foregoing that we have provided novel method and means for electrostatically coating articles of all kinds with powder materials, having many and important advantages over prior methods and apparatus of this general character, which advantages are primarily due to the fact that a sheet-like jet of powder is formed in which substantially all of the particles throughout the depth or thickness dimension of the sheet are effectively charged to a high electric potential of a desired polarity owing to said particles being discharged past an ionizing element substantially coextensive with a major dimension of a cross section of the sheet.

While preferred embodiments of the invention and modifications thereof have been illustrated and described for purposes of example, it is to be understood that various other modifications may be made without departing from the scope of the invention.

What is claimed is:

1. Apparatus for coating an object with powder comprising in combination a container for storing said powder, a source of gas under pressure, a spraying device comprising an inlet and a discharge orifice, and a passage connecting said inlet and discharge orifices, a gas tube connecting said gas source to said powder container and a suspension-delivery tube connecting said container and gas tube to said inlet, whereby gas arriving through said gas tube will draw powder into said suspension-delivery tube and deliver it as a suspension to said spraying device, valve means controlling the flow of gas in said gas tube, said suspension-delivery tube forming with the passage in said spraying device a valveless substantially obstruction-free passageway leading from said powder container to said discharge orifice, said discharge orifice including a terminal edge and means to confine fluid flowing therethrough into a thin sheet having a large dimension coextensive with said terminal edge and a small dimension in a plane normal to the direction of flow, an elongated electrode for ionizing said powder as it is discharged by said spraying device, said electrode being substantially coextensive with the large dimension of said thin sheet and with said terminal edge, and a source of high voltage having one pole connected to said electrode, while its other pole is adapted to be connected to said object.

2. Apparatus as claimed in claim 1 in which said spraying device is provided with a plurality of discharge orifices, each having a large dimension and a small dimension.

3. Apparatus as claimed in claim 1 in which said discharge orifice is annular.

4. Apparatus as claimed in claim 1 in which said discharge orifice is a thin rectangle.

5. Apparatus as claimed in claim 1 in which said spraying device comprises rotary means for rotating said sheet and electrode about an axis extending in said direction of stream flow.

6. Apparatus as claimed in claim 1 in which said terminal edge constitutes said electrode.

References Cited by the Examiner

UNITED STATES PATENTS

| | | | |
|---|---|---|---|
| 1,617,166 | 2/1927 | Schoop | 117—105 |
| 1,779,850 | 10/1930 | Maurer | 117—105 |
| 2,710,773 | 6/1955 | Sedlacsik | 239—15 |
| 2,759,763 | 8/1956 | Juvinall | 239—3 |
| 2,803,496 | 8/1957 | Ransburg | 239—15 |
| 2,961,581 | 11/1960 | Grave et al. | 239—15 |
| 2,995,393 | 8/1961 | Charp | 117—17 |
| 3,049,301 | 8/1962 | Heuschkel | 239—15 |
| 3,082,956 | 3/1963 | Point | 239—15 |
| 3,085,749 | 4/1963 | Schweitzer et al. | 239—3 |
| 3,121,533 | 2/1964 | Sedlacsik | 239—3 |

WILLIAM D. MARTIN, *Primary Examiner.*

G. L. HUBBARD, S. W. ROTHSTEIN,
*Assistant Examiners.*